(12) United States Patent
Montemerlo et al.

(10) Patent No.: US 11,473,931 B2
(45) Date of Patent: Oct. 18, 2022

(54) SURFEL MAP EDITING

(71) Applicant: Waymo LLC, Mountain View, CA (US)

(72) Inventors: Michael Montemerlo, Mountain View, CA (US); Colin Andrew Braley, Mountain View, CA (US)

(73) Assignee: Waymo LLC, Mountain View, CA (US)

( * ) Notice: Subject to any disclaimer, the term of this patent is extended or adjusted under 35 U.S.C. 154(b) by 268 days.

(21) Appl. No.: 17/021,811

(22) Filed: Sep. 15, 2020

(65) Prior Publication Data
US 2022/0082408 A1 Mar. 17, 2022

(51) Int. Cl.
*G06V 20/56* (2022.01)
*G01C 21/00* (2006.01)
*G06V 20/64* (2022.01)

(52) U.S. Cl.
CPC ......... *G01C 21/3841* (2020.08); *G06V 20/56* (2022.01); *G06V 20/64* (2022.01)

(58) Field of Classification Search
CPC ..... G01C 21/3841; G06V 20/56; G06V 20/64
See application file for complete search history.

(56) References Cited

U.S. PATENT DOCUMENTS

| | | | | |
|---|---|---|---|---|
| 11,157,768 B1 * | 10/2021 | Levinson | ............ | G05D 1/0246 |
| 2018/0005407 A1 * | 1/2018 | Browning | ........... | B60W 30/095 |
| 2021/0149022 A1 * | 5/2021 | Kehl | ................... | G01S 13/862 |
| 2021/0149408 A1 * | 5/2021 | Dodson | ................. | G06V 20/58 |
| 2021/0150278 A1 * | 5/2021 | Dudzik | ................ | G01S 17/86 |
| 2021/0182596 A1 * | 6/2021 | Adams | ............... | G06K 9/6256 |

OTHER PUBLICATIONS

Behley et al., "Efficient Surfel-Based SLAM using 3D Laser Range Data in Urban Environments," Robotics: Science and Systems, 2018, 10 pages.
Park et al., "Probabilistic Surfel Fusion for Dense LiDAR Mapping," Proceedings of the IEEE International Conference on Computer Vision, 2017, pp. 2418-2426.
(Continued)

*Primary Examiner* — Richard M Camby
(74) *Attorney, Agent, or Firm* — Fish & Richardson P.C.

(57) ABSTRACT

Methods, systems, and apparatus, including computer programs encoded on computer storage media, for processing an initial representation of an environment to generate an updated representation that includes representations of one or more objects there were obscured in the initial representation. One of the methods includes obtaining initial surfel data comprising a plurality of surfels; determining a plurality of non-static surfels from the plurality of surfels; obtaining guidance data that characterizes a prediction for static surfaces in one or more first regions of the environment that were obscured by the plurality of non-static surfels in the initial surfel data; and processing the guidance data and the initial surfel data to generate final surfel data that comprises, for each first region of the environment, a plurality of predicted surfels that represent static surfaces in the first region that are partially or wholly obscured by objects represented by respective non-static surfels.

20 Claims, 7 Drawing Sheets

(56) References Cited

OTHER PUBLICATIONS

Pfister et al., "Surfels: surface elements as rendering primitives." Proceedings of the 27th annual conference on Computer graphics and interactive techniques, 2000, pp. 335-342.
Schops et al., "SurfelMeshing: Online Surfel-Based Mesh Reconstruction," CoRR, Oct. 2018, arxiv.org/abs/1810.00729v1, 13 pages.
Stuckler et al., "Efficient Mobile Robot Navigation using 3D Surfel Grid Maps," In Proc. of the German Conference on Robotics, May 2012, 5 pages.
Stuckler et al., "Multi-Resolution Surfel Maps for Efficient Dense 3D Modeling and Tracking," Journal of Visual Communication and Image Representation, Jan. 2014, 25(1):137-147.
Wang et al., "Real-time Scalable Dense Surfel Mapping," 2019 International Conference on Robotics and Automation, May 2019, pp. 6919-6925.
Perez et al., "Poisson Image Editing," ACM Siggraph 2003 Papers, Jul. 2003, pp. 313-318.

\* cited by examiner

SURFEL MAP EDITING

BACKGROUND

This specification relates to automatic planning of autonomous vehicle driving decisions.

Autonomous vehicles include self-driving cars, boats, and aircraft. Autonomous vehicles use a variety of on-board sensors in tandem with map representations of the environment in order to make control and navigation decisions.

Some vehicles use a two-dimensional or a 2.5-dimensional map to represent characteristics of the operating environment. A two-dimensional map associates each location, e.g., as given by latitude and longitude, with some properties, e.g., whether the location is a road, or a building, or an obstacle. A 2.5-dimensional map additionally associates a single elevation with each location. However, such 2.5-dimensional maps are problematic for representing three-dimensional features of an operating environment that might in reality have multiple elevations. For example, overpasses, tunnels, trees, and lamp posts all have multiple meaningful elevations within a single latitude/longitude location on a map.

SUMMARY

This specification describes how a system can automatically process an initial surfel map that has been generated using sensor data captured by one or more sensors in an environment, where a region in the environment was obstructed from the sensors by an object, in order to generate a final surfel map that includes a prediction of the obstructed region. That is, the final surfel map includes multiple surfels that represent static surfaces predicted to be in the region obstructed by the object.

In particular, the system can obtain the initial surfel map and identify the surfels representing the obstructing object. If the obstructing object is a non-static object, then the system can remove the surfels representing the object from the initial surfel map to generate an updated surfel map. That is, if the object is not a permanent feature of the environment, e.g., a parked car that will likely move or a construction equipment that will be removed when the construction is completed, then the system can remove the surfels corresponding to the object from the initial surfel map, because the surfel map is intended to represent permanent features of the environment. The system can then process the updated surfel map according to guidance data in order to generate a final surfel map that includes surfels representing static surfaces that are predicted to have been obstructed by the object. That is, the final surfel map can include i) the surfels in the updated surfel map and ii) new surfels corresponding to surfaces that are permanent features of the environment (e.g., the road or curb beneath a parked car) but that were obstructed by the non-static object.

Particular embodiments of the subject matter described in this specification can be implemented so as to realize one or more of the following advantages.

When a system on-board a vehicle operating in an environment processes a representation of the environment in order to generate a planned path for the vehicle, it is often preferable for the representation to include only permanent features of the environment and to exclude any non-permanent object, e.g., other vehicles in the environment, debris, etc. That is, the ideal representation of an environment is an "empty" representation that depicts the environment as if the environment were empty of any non-static object. Then, the on-board system can more efficiently detect when a change has occurred in the environment, e.g., when a new non-static object has appeared in the environment, and thus generate a planned path that accounts for the changes in the environment.

If a non-static object is depicted in a representation of the environment, e.g., a surfel representation, then this can significantly slow down the perception system of a vehicle operating in the environment. As a particular example, a parked car may be depicted in the surfel representation, and the parked car may have since been removed from the environment leaving an empty parking space. Then, a vehicle operating in the environment that captures sensor data characterizing the empty parking space might identify a discrepancy between the surfel representation and the sensor data. The vehicle must then rectify the discrepancy, e.g., by updating the surfel representation, which can slow down the generation of predictions and driving decisions.

Using techniques described in this specification, a system can process an initial representation of an environment generated from sensor data captured by sensor on-board a vehicle in order to generate an "empty" representation of the environment. That is, the initial representation can include representations of non-static objects in the environment at the time the sensor data was captured. The system can remove the portions of the representation corresponding to the non-static objects, and then use guidance data to predict static surfaces in the environment that were obstructed from the sensors, where the guidance data characterizes a predicted shape of the obstructed static surfaces. The generated representation can then be used by multiple different vehicles operating in the environment in order to make driving decisions. Thus, the system can generate a prediction for surfaces in the environment that may never have been observed by a sensor on-board any of the multiple different vehicles operating in the environment.

In some existing systems, a user must manually identify the portions of the representation of an environment that are non-static, e.g., manually outline the portion of the representation corresponding to a parked car, leaving a hole in the representation. Using techniques described in this specification, a system can automatically identify and remove the portions of the representation of an environment that are non-static, without any kind of user intervention.

Some existing systems use a 2.5-dimensional system to represent an environment, which limits the representation to a single element having a particular altitude for each (latitude, longitude) coordinate in the environment. Using techniques described in this specification, a system can instead leverage a three-dimensional surfel map to make autonomous driving decisions. The three-dimensional surfel map allows multiple different elements at respective altitudes for each (latitude, longitude) coordinate in the environment, yielding a more accurate and flexible representation of the environment.

Some existing systems rely entirely on existing representations of the world, generated offline using sensor data generated at previous time points, to navigate through a particular environment. These systems can be unreliable, because the state of the environment might have changed since the representation was generated offline or since the environment was lat observed. Some other existing systems rely entirely on sensor data generated by the vehicle at the current time point to navigate through a particular environment. These systems can be inefficient, because they fail to leverage existing knowledge about the environment that the vehicle or other vehicles have gathered at previous time points. Using techniques described in this specification, an on-board system can combine an existing surfel map and online sensor data to generate a prediction for the state of the environment. The existing surfel data allows the system to get a jump-start on the prediction and plan ahead for regions that are not yet in the range of the sensors of the vehicle, while the sensor data allows the system to be agile to changing conditions in the environment.

Using a surfel representation to combine the existing data and the new sensor data can be particularly efficient with respect to the time, memory, and processing power required. Using techniques described in this specification, a system can quickly integrate new sensor data with the data in the surfel map to generate a representation that is also a surfel map. This process is especially time- and memory-efficient because surfels require relatively little bookkeeping, as each surfel is an independent entity. Existing systems that rely, e.g., on a 3D mesh cannot integrate sensor data as seamlessly because if the system moves one particular vertex of the mesh, then the entire mesh is affected; different vertices might cross over each other, yielding a crinkled mesh that must be untangled. Updating the mesh can therefore be a lengthy and computationally expensive process.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

This specification describes how a vehicle, e.g., an autonomous or semi-autonomous vehicle, can process an initial surfel map that includes surfels characterizing non-static objects in an environment to generate a final surfel map that includes surfels characterizing predicted static surfaces in the environment that are obstructed by the non-static objects.

In this specification, an object or surface in an environment is "static" if the object or surface is a permanent feature of the environment, i.e., if the object or surface is likely to be in the environment for the long-term. Examples of static objects include the road surface, buildings, road signs, lamp posts, etc. An object or surface in the environment is "non-static" if the object or surface is not a permanent feature of the environment, i.e., if the object or surface can be removed from the environment. Examples of non-static objects include parked cars, debris, construction equipment, trash bins, etc.

In this specification, a surfel is data that represents a two-dimensional surface that corresponds to a particular three-dimensional coordinate system in an environment. A surfel includes data representing a position and an orientation of the two-dimensional surface in the three-dimensional coordinate system. The position and orientation of a surfel can be defined by a corresponding set of coordinates. For example, a surfel can be defined by spatial coordinates, e.g., (x,y,z) defining a particular position in a three-dimensional coordinate system, and orientation coordinates, e.g., (pitch, yaw, roll) defining a particular orientation of the surface at the particular position. As another example, a surfel can be defined by spatial coordinates that define the particular position in a three-dimensional coordinate system and a normal vector, e.g. a vector with a magnitude of 1, that defines the orientation of the surface at the particular position. The location of a surfel can be represented in any appropriate coordinate system. In some implementations, a system can divide the environment being modeled to include volume elements (voxels) and generate at most one surfel for each voxel in the environment that includes a detected object. In some other implementations, a system can divide the environment being modeled into voxels, where each voxel can include multiple surfels; this can allow each voxel to represent complex surfaces more accurately.

A surfel can also optionally include size and shape parameters, although often all surfels in a surfel map have the same size and shape. A surfel can have any appropriate shape. For example, a surfel can be a square, a rectangle, an ellipsoid, or a two-dimensional disc, to name just a few examples.

In this specification, a surfel map is a collection of surfels that each correspond to a respective location in the same environment. The surfels in a surfel map collectively represent the surface detections of objects in the environment. In some implementations, each surfel in a surfel map can have additional data associated with it, e.g. one or more labels describing the surface or object characterized by the surfel. As a particular example, if a surfel map represents a portion of a city block, then each surfel in the surfel map can have a semantic label identifying the object that is being partially characterized by the surfel, e.g. "streetlight," "stop sign," "mailbox," etc.

A surfel map can characterize a real-world environment, e.g. a particular portion of a city block in the real world, or a simulated environment, e.g. a virtual intersection that is used to simulate autonomous driving decisions to train one or more machine learning models. As a particular example, a surfel map characterizing a real-world environment can be generated using sensor data that has been captured by sensors operating in the real-world environment, e.g. sensors on-board a vehicle navigating through the environment. In some implementations, an environment can be partitioned into multiple three-dimensional volumes, e.g. a three-dimensional grid of cubes of equal size, and a surfel map characterizing the environment can have at most one surfel corresponding to each volume.

After the surfel map has been generated, e.g., by combining sensor data gathered by multiple vehicles across multiple trips through the real-world, one or more systems on-board a vehicle can receive the generated surfel map. Then, when navigating through a location in the real world that is represented by the surfel map, the vehicle can process the surfel map along with real-time sensor measurements of the environment in order to make better driving decisions than if the vehicle were to rely on the real-time sensor measurements alone.

Figure 1:
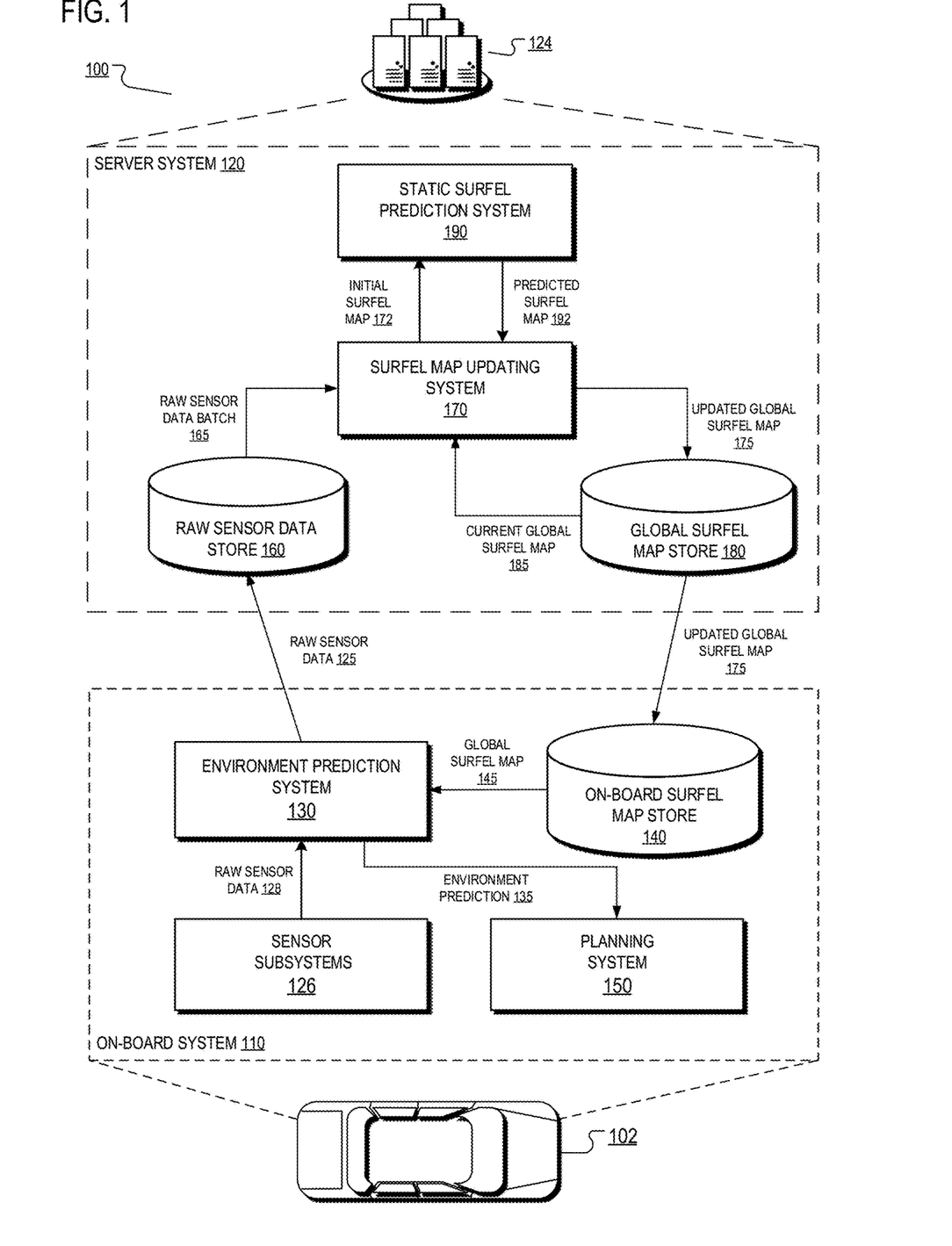
FIG. 1 is a diagram of an example system.

FIG. 1 is a diagram of an example system 100. The system 100 can include multiple vehicles, each with a respective on-board system. For simplicity, a single vehicle 102 and its on-board system 110 is depicted in FIG. 1. The system 100 also includes a server system 120 which every vehicle in the system 100 can access.

The vehicle 102 in FIG. 1 is illustrated as an automobile, but the on-board system 102 can be located on-board any appropriate vehicle type. The vehicle 102 can be a fully autonomous vehicle that determines and executes fully-autonomous driving decisions in order to navigate through an environment. The vehicle 102 can also be a semi-autonomous vehicle that uses predictions to aid a human driver. For example, the vehicle 102 can autonomously apply the brakes if a prediction indicates that a human driver is about to collide with an object in the environment, e.g. an object or another vehicle represented in a surfel map. The on-board system 110 includes one or more sensor subsystems 126. The sensor subsystems 126 include a combination of components that receive reflections of electromagnetic radiation, e.g., lidar systems that detect reflections of laser light, radar systems that detect reflections of radio waves, and camera systems that detect reflections of visible light.

The sensor data generated by a given sensor generally indicates a distance, a direction, and an intensity of reflected radiation. For example, a sensor can transmit one or more pulses of electromagnetic radiation in a particular direction and can measure the intensity of any reflections as well as the time that the reflection was received. A distance can be computed by determining how long it took between a pulse and its corresponding reflection. The sensor can continually sweep a particular space in angle, azimuth, or both. Sweeping in azimuth, for example, can allow a sensor to detect multiple objects along the same line of sight.

The sensor subsystems 126 or other components of the vehicle 102 can also classify groups of one or more raw sensor measurements from one or more sensors as being measures of an object of a particular type. A group of sensor measurements can be represented in any of a variety of ways, depending on the kinds of sensor measurements that are being captured. For example, each group of raw laser sensor measurements can be represented as a three-dimensional point cloud, with each point having an intensity and a position. In some implementations, the position is represented as a range and elevation pair. Each group of camera sensor measurements can be represented as an image patch, e.g., an RGB image patch.

Once the sensor subsystems 126 classify one or more groups of raw sensor measurements as being measures of a respective object of a particular type, the sensor subsystems 126 can compile the raw sensor measurements into a set of raw sensor data 128, and send the raw data 128 to an environment prediction system 130.

The on-board system 110 also includes an on-board surfel map store 140 that stores a global surfel map 145 of the real-world. The global surfel map 145 is an existing surfel map that has been generated by combining sensor data captured by multiple vehicles navigating through the real world.

Generally, every vehicle in the system 100 uses the same global surfel map 145. In some cases, different vehicles in the system 100 can use different global surfel maps 145, e.g. when some vehicles have not yet obtained an updated version of the global surfel map 145 from the server system 120.

Each surfel in the global surfel map 145 can have associated data that encodes multiple classes of semantic information for the surfel. For example, for each of the classes of semantic information, the surfel map can have one or more labels characterizing a prediction for the surfel corresponding to the class, where each label has a corresponding probability. As a particular example, each surfel can have multiple labels, with associated probabilities, predicting the type of the object characterized by the surfel, e.g. "pole" with probability 0.8, "street sign" with probability 0.15, and "fire hydrant" with probability 0.05.

The associated data for each surfel can include a prediction of whether the surface represents a static or non-static surface. In some implementations, the associated data can include a "static" label that predicts a probability that the surface represented by the surfel is a static surface; e.g., the "static" label can be a value between 0 and 1, where 0 correspond to a non-static object and 1 corresponds to a static object. In some other implementations, each label corresponding to the type of the object characterized by the surfel can be characterized as either "static" or "non-static." For example, "pole," "street sign," and "fire hydrant" might be categorized as static, while "vehicle" and "trash bin" might be categorized as non-static.

The environment prediction system 130 can receive the global surfel map 145 and combine it with the raw sensor data 128 to generate an environment prediction 135. The environment prediction 135 includes data that characterizes a prediction for the current state of the environment, including predictions for an object or surface at one or more locations in the environment.

The raw sensor data 128 might show that the environment through which the vehicle 102 is navigating has changed. In some cases, the changes might be large and discontinuous, e.g., if a new building has been constructed or a road has been closed for construction since the last time the portion of the global surfel map 145 corresponding to the environment has been updated. In some other cases, the changes might be small and continuous, e.g., if a bush grew by an inch or a leaning pole increased its tilt. In either case, the raw sensor data 128 can capture these changes to the world, and the environment prediction system 130 can use the raw sensor data to update the data characterizing the environment stored in the global surfel map 145 to reflect these changes in the environment prediction 135.

For one or more objects represented in the global surfel map 145, the environment prediction system 130 can use the raw sensor data 128 to determine a probability that the object is currently in the environment. In some implementations, the environment prediction system 130 can use a Bayesian model to generate the predictions of which objects are currently in the environment, where the data in the global surfel map 145 is treated as a prior distribution for the state of the environment, and the raw sensor data 128 is an observation of the environment. The environment prediction system 130 can perform a Bayesian update to generate a posterior belief of the state of the environment, and include this posterior belief in the environment prediction 135. In some implementations, the raw sensor data 128 also has a probability distribution for each object detected by the sensor subsystem 126 describing a confidence that the object is in the environment at the corresponding location; in some other implementations, the raw sensor data 128 includes detected objects with no corresponding probability distribution.

For example, if the global surfel map 145 includes a representation of a particular object, and the raw sensor data 128 includes a strong detection of the particular object in the same location in the environment, then the environment prediction 135 can include a prediction that the object is in the location with high probability, e.g. 0.95 or 0.99. If the global surfel map 145 does not include the particular object, but the raw sensor data 128 includes a strong detection of the particular object in the environment, then the environment prediction 135 might include a weak prediction that the object is in the location indicated by the raw sensor data 128, e.g. predict that the object is at the location with probability of 0.5 or 0.6. If the global surfel map 145 does include the particular object, but the raw sensor data 128 does not include a detection of the object at the corresponding location, or includes only a weak detection of the object, then the environment prediction 135 might include a prediction that has moderate uncertainty, e.g. assigning a 0.7 or 0.8 probability that the object is present.

That is, the environment prediction system 130 might assign more confidence to the correctness of the global surfel map 145 than to the correctness of the raw sensor data 128. In some other implementations, the environment prediction system 130 might assign the same or more confidence to the correctness of the sensor data 128 than to the correctness of the global surfel map 145. In either case, the environment prediction system 130 does not treat the raw sensor data 128 or the global surfel map 145 as a ground-truth, but rather associates uncertainty with both in order to combine them. Approaching each input in a probabilistic manner can generate a more accurate environment prediction 135, as the raw sensor data 128 might have errors, e.g. if the sensors in the sensor subsystems 126 are miscalibrated, and the global surfel map 145 might have errors, e.g. if the state of the world has changed.

In some implementations, the environment prediction 135 can also include a prediction for each class of semantic information for each object in the environment. For example, the environment prediction system 130 can use a Bayesian model to update the associated data of each surfel in the global surfel map 145 using the raw sensor data 128 in order to generate a prediction for each semantic class and for each object in the environment. For each particular object represented in the global surfel map 145, the environment prediction system 130 can use the existing labels of semantic information of the surfels corresponding to the particular object as a prior distribution for the true labels for the particular object. The environment prediction system 130 can then update each prior using the raw sensor data 128 to generate posterior labels and associated probabilities for each class of semantic information for the particular object. In some such implementations, the raw sensor data 128 also has a probability distribution of labels for each semantic class for each object detected by the sensor subsystem 126; in some other such implementations, the raw sensor data 128 has a single label for each semantic class for each detected object.

Continuing the previous particular example, where a particular surfel characterizes a pole with probability 0.8, a street sign with probability 0.15, and fire hydrant with probability 0.05, if the sensor subsystems 126 detect a pole at the same location in the environment with high probability, then the Bayesian update performed by the environment prediction system 130 might generate new labels indicating that the object is a pole with probability 0.85, a street sign with probability 0.12, and fire hydrant with probability 0.03. The new labels and associated probabilities for the object are added to the environment prediction 135.

The environment prediction system 130 can provide the environment prediction 135 to a planning system 150 of the vehicle 102, which can use the environment prediction 130 to make autonomous driving decisions, e.g., generating a planned trajectory for the vehicle 102 through the environment.

The environment prediction system 130 can also provide the raw sensor data 128 to a raw sensor data store 160 located in the server system 120.

The server system 120 is typically hosted within a data center 124, which can be a distributed computing system having hundreds or thousands of computers in one or more locations.

The server system 120 includes a raw sensor data store 160 that stores raw sensor data generated by respective vehicles navigating through the real world. As each vehicle captures new sensor data characterizing locations in the real world, each vehicle can provide the sensor data to the server system 120. The server system 120 can then use the sensor data to update the global surfel map that every vehicle in the system 100 uses. That is, when a particular vehicle discovers that the real world has changed in some way, e.g. construction has started at a particular intersection or a street sign has been taken down, the vehicle can provide sensor data to the server system 120 so that the rest of the vehicles in the system 100 can be informed of the change.

The server system 120 also includes a global surfel map store 180 that maintains the current version of the global surfel map 185.

A surfel map updating system 170, also hosted in the server system 120, can obtain the current global surfel map 185 and a batch of raw sensor data 165 from the raw sensor data store 160 in order to generate an updated global surfel map 175. In some implementations, the surfel map updating system 170 updates the global surfel map at regular time intervals, e.g. once per hour or once per day, obtaining a batch of all of the raw sensor data 165 that has been added to the raw sensor data store 160 since the last update. In some other implementations, the surfel map updating system 170 updates the global surfel map whenever a new raw sensor data 128 is received by the raw sensor data store 160.

In some implementations, the surfel map updating system 170 generates the updated global surfel map 175 in a probabilistic way.

In some such implementations, for each measurement in the batch of raw sensor data 165, the surfel map updating system 170 can determine a surfel in the current global surfel map 185 corresponding to the location in the environment of the measurement, and combine the measurement with the determined surfel. For example, the surfel map updating system 170 can use a Bayesian model to update the associated data of a surfel using a new measurement, treating the associated data of the surfel in the current global surfel map 185 as a prior distribution. The surfel map updating system 170 can then update the prior using the measurement to generate posterior distribution for the corresponding location. This posterior distribution is then included in the associated data of the corresponding surfel in the updated global surfel map 175.

If there is not currently a surfel at the location of a new measurement, then the surfel map updating system 170 can generate a new surfel according to the measurement.

In some such implementations, the surfel map updating system 170 can also update each surfel in the current global surfel map 185 that did not have a corresponding new measurement in the batch of raw sensor data 165 to reflect a lower certainty that an object is at the location corresponding to the surfel. In some cases, e.g. if the batch of raw sensor data 165 indicates a high confidence that there is not an object at the corresponding location, the surfel map updating system 170 can remove the surfel from the updated global surfel map 175 altogether. In some other cases, e.g. when the current global surfel map 185 has a high confidence that the object characterized by the surfel is permanent and therefore that the lack of a measurement of the object in the batch of raw sensor data 165 might be an error, the surfel map updating system 170 might keep the surfel in the updated global surfel map 175 but decrease the confidence of the updated global surfel map 175 that an object is at the corresponding location.

If there are non-static objects depicted in sensor measurements of the raw sensor data batch 165, then the surfel map updating system 170 might include surfels representing the non-static objects in the updated global surfel map 175 in error. That is, the updated global surfel map 175 is intended only to include surfels that represent static objects in the environment. To ensure this, the surfel map updating system 170 can use a static surfel prediction system 190, also in the server system 120, to remove the surfels representing non-static objects and replace them with surfels representing predicted static objects obscured by the non-static objects.

The static surfel prediction system 190 is configured to receive an initial surfel map 172 that might include surfels characterizing non-static surfaces in the environment, and to process the initial surfel map 172 to generate a predicted surfel map 192 that i) does not include surfels characterizing non-static surfaces and ii) includes predicted surfels that characterize predicted static surfaces obscured by the non-static surfaces. In this specification, a "predicted" surfel is a surfel that characterizes a predicted surface in the environment, i.e., a surface that has not been directly observed by the sensor subsystems 126. The predicted surfels can each have associated data indicating a high likelihood that the predicted surfel characterizes a static surface. For example, each surfel might have associated data that includes a "static" label that indicates a high likelihood the corresponding surface is static, e.g., a "static" label of 1.0 or 0.95.

That is, in the process of generating the global surfel map 175, the surfel map updating system 170 can provide an initial surfel map 172 that includes depictions of non-static objects to the static surfel prediction system 190, and receive back a predicted surfel map 192 that has removed the depictions of the non-static objects and replaced them with depictions of predicted static surfaces. For example, the surfel map updating system 170 might generate an initial updated global surfel map as described above, provide the initial global surfel map to the static surfel prediction system 190, obtain back a predicted surfel map 192, and determine the predicted surfel map 192 to be the updated global surfel map 175.

As a particular example, the static surfel prediction system 190 might use guided interpolation to generate the predicted surfel map 192. This process is described in more detail below with respect to FIG. 4.

After generating the updated global surfel map 175, the surfel map updating system 170 can store it in the global surfel map store 180, replacing the stale global surfel map 185. Each vehicle in the system 100 can then obtain the updated global surfel map 175 from the server system 120, e.g., through a wired or wireless connection, replacing the stale version with the retrieved updated global surfel map 175 in the on-board surfel map store 140. In some implementations, each vehicle in the system 100 retrieves an updated global surfel map 175 whenever the global surfel map is updated and the vehicle is connected to the server system 120 through a wired or wireless connection. In some other implementations, each vehicle in the system 100 retrieves the most recent updated global surfel map 175 at regular time intervals, e.g. once per day or once per hour.

Figure 2A:
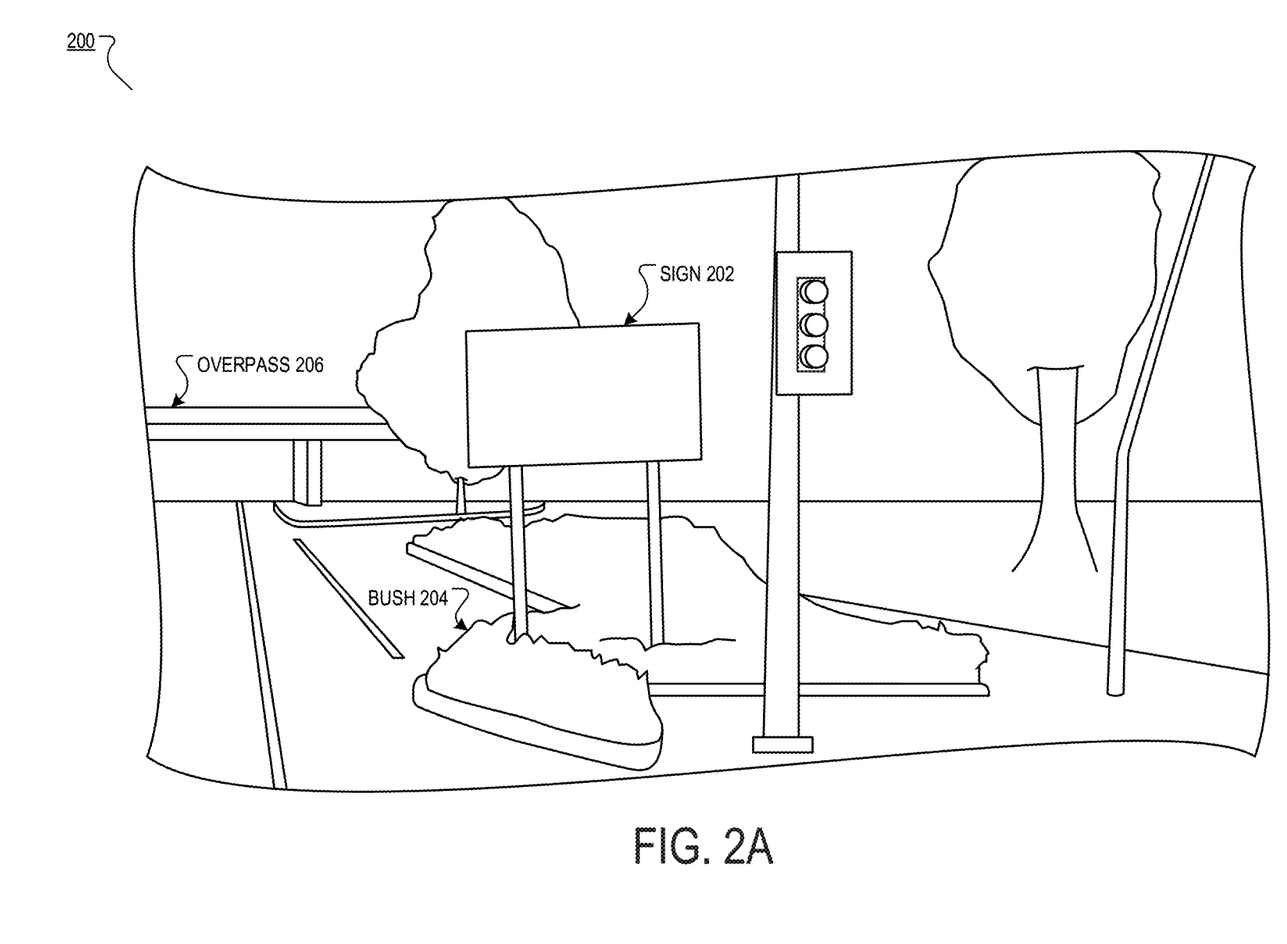
FIG. 2A is an illustration of an example environment.

FIG. 2A is an illustration of an example environment 200. The environment 200 is depicted from the point of view of a sensor on-board a vehicle navigating through the environment 200. The environment 200 includes a sign 202, a bush 204, and an overpass 206.

Figure 2B:
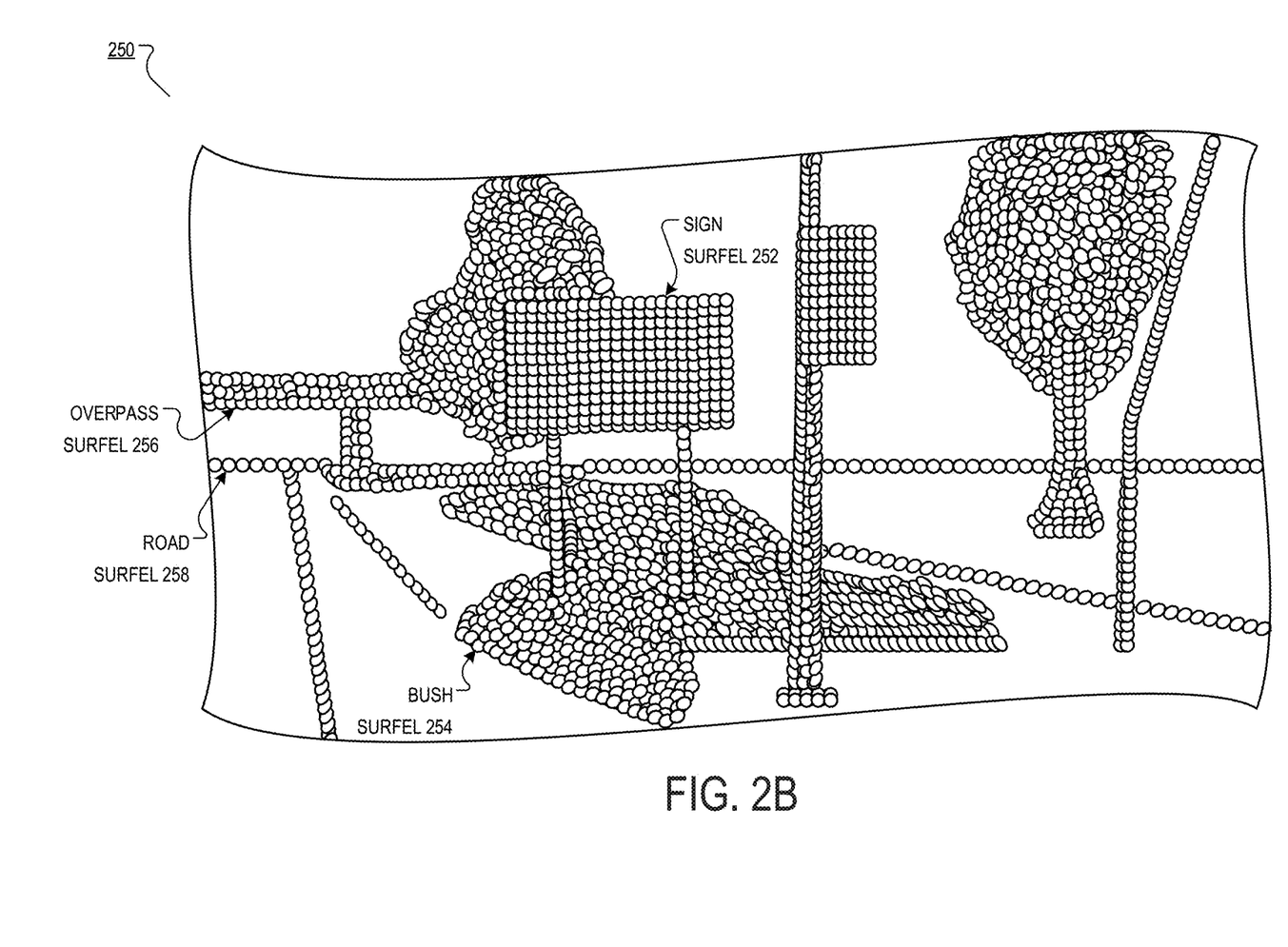
FIG. 2B is an illustration of an example surfel map of the environment of FIG. 2A.

FIG. 2B is an illustration of an example surfel map 250 of the environment 200 of FIG. 2A.

Each surfel in the surfel map 250 is represented by a disk, and defined by three coordinates (latitude, longitude, altitude), that identify a position of the surfel in a common coordinate system of the environment 200 and by a normal vector that identifies an orientation of the surfel. For example, each voxel can be defined to be the disk that extends some radius, e.g. 1, 10, 25, or 100 centimeters, around the (latitude, longitude, altitude) coordinate. In some other implementations, the surfels can be represented as other two-dimensional shapes, e.g. ellipsoids or squares.

The environment 200 is partitioned into a grid of equal-sized voxels. Each voxel in the grid of the environment 200 can contain at most one surfel, where, e.g., the (latitude, longitude, altitude) coordinate of each surfel defines the voxel that the surfel occupies. That is, if there is a surface of an object at the location in the environment corresponding to a voxel, then there can be a surfel characterizing the surface in the voxel; if there is not a surface of an object at the location, then the voxel is empty. In some other implementations, a single surfel map can contain surfels of various different sizes that are not organized within a fixed spatial grid.

Each surfel in the surfel map 250 has associated data characterizing semantic information for the surfel. For example, as discussed above, for each of multiple classes of semantic information, the surfel map can have one or more labels characterizing a prediction for the surfel corresponding to the class, where each label has a corresponding probability. As a particular example, each surfel can have multiple labels, with associated probabilities, predicting the type of the object characterized by the surfel. As another particular example, each surfel can have multiple labels, with associated probabilities, predicting the permanence of the object characterized by the surfel; for example, a "permanent" label might have a high associated probability for surfels characterizing buildings, while the "permanent" label might have a high probability for surfels characterizing vegetation. Other classes of semantic information can include a color, reflectivity, or opacity of the object characterized by the surfel.

For example, the surfel map 250 includes a sign surfel 252 that characterizes a portion of the surface of the sign 202 depicted in FIG. 2A. The sign surfel 252 might have labels predicted that the type of the object characterized by the sign surfel 252 is "sign" with probability 0.9 and "billboard" with probability 0.1. Because street signs are relatively permanent objects, the "permanent" label for the sign surfel 252 might be 0.95. The sign surfel 252 might have color labels predicting the color of the sign 202 to be "green" with probability 0.8 and "blue" with probability 0.2. Because the sign 202 is completely opaque and reflects some light, an opacity label of the sign surfel 252 might predict that the sign is "opaque" with probability 0.99 and a reflectivity label of the sign surfel 252 might predict that the sign is "reflective" with probability 0.6.

As another example, the surfel map 250 includes a bush surfel 254 that characterizes a portion of the bush 204 depicted in FIG. 2A. The bush surfel 254 might have labels predicted that the type of the object characterized by the bush surfel 254 is "bush" with probability 0.75 and "tree" with probability 0.25. Because bushes can grow, be trimmed, and die with relative frequency, the "permanent"

label for the bush surfel 254 might be 0.2. The bush surfel 254 might have color labels predicting the color of the bush 204 to be "green" with probability 0.7 and "yellow" with probability 0.3. Because the bush 204 is not completely opaque and does not reflect a lot of light, an opacity label of the bush surfel 254 might predict that the sign is "opaque" with probability 0.7 and a reflectivity label of the sign surfel 252 might predict that the sign is "reflective" with probability 0.4.

Note that, for any latitude and longitude in the environment 200, i.e. for any given (latitude, longitude) position in a plane running parallel to the ground of the environment 200, the surfel map 250 can include multiple different surfels each corresponding to a different altitude in the environment 200, as defined by the altitude coordinate of the surfel. This represents a distinction between some existing techniques that are "2.5-dimensional," i.e., techniques that only allow a map to contain a single point at a particular altitude for any given latitude and longitude in a three-dimensional map of the environment. These existing techniques can sometimes fail when an environment has multiple objects at respective altitudes at the same latitude and longitude in the environment. For example, such existing techniques would be unable to capture both the overpass 206 in the environment 200 and the road underneath the overpass 205. The surfel map, on the other hand, is able to represent both the overpass 206 and the road underneath the overpass 206, e.g. with an overpass surfel 256 and a road surfel 258 that have the same latitude coordinate and longitude coordinate but a different altitude coordinate.

Figure 3A:
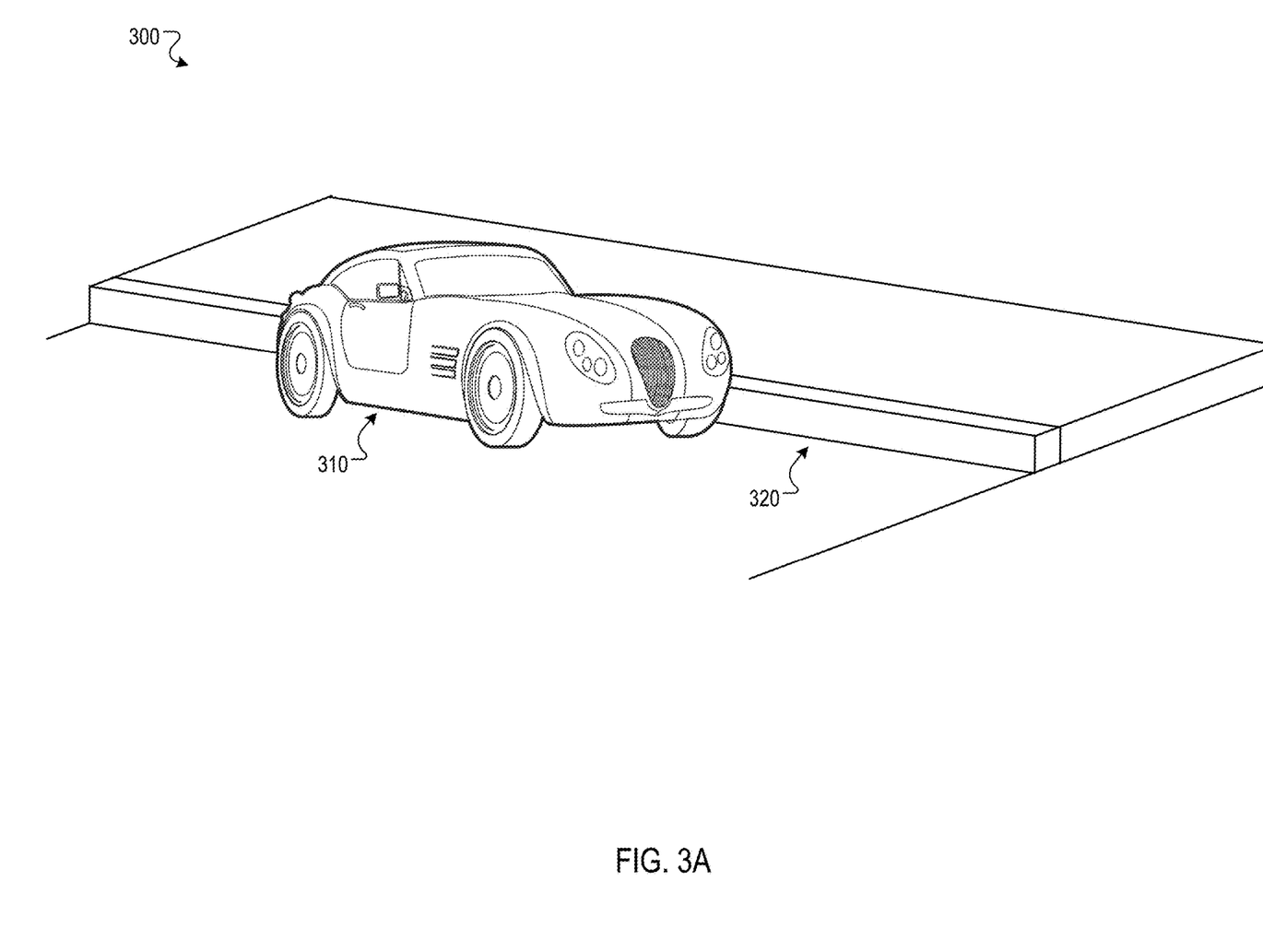
FIGS. 3A, 3B, and 3C are illustrations of different representations of an example environment.

FIG. 3A is an illustration of a first representation 300 of an example environment.

The first representation 300 of the environment includes a representation 310 of a parked vehicle in the environment. The first representation 300 of the environment also includes a representation 320 of a curb by which the vehicle is parked.

In some implementations, the first representation 300 of the environment is a surfel representation. That is, the first representation 300 of the environment includes multiple surfels characterizing respective surfaces in the environment. For example, the representation 310 of the parked vehicle can include multiple "vehicle" surfels, e.g., surfels that have associated data identifying the surfel as characterizing an object of type "vehicle." The representation 320 of the curb can include multiple "curb" surfels, e.g., surfels that have associated data identifying the surfel as characterizing an object of type "curb."

Figure 3B:
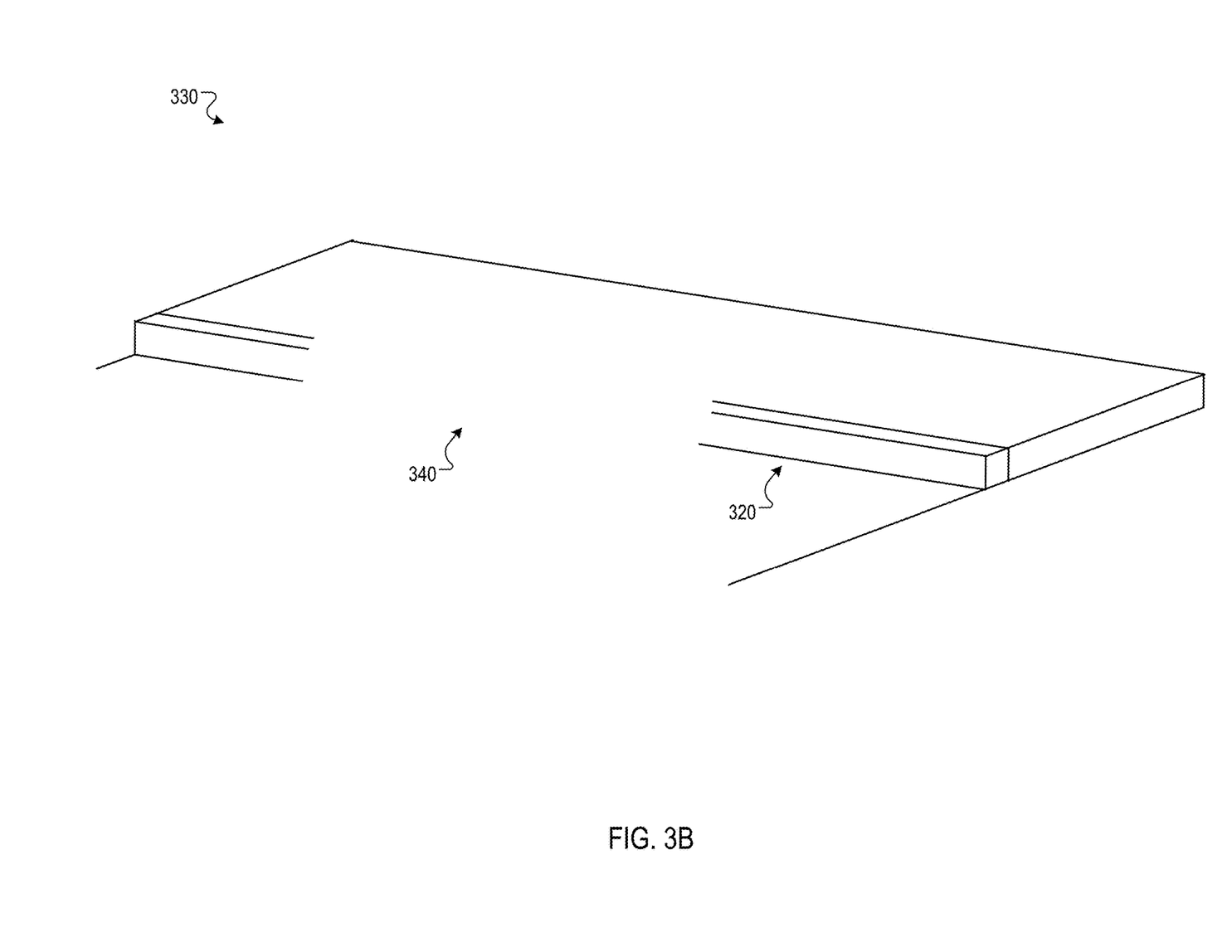

FIG. 3B is an illustration of a second representation 330 of the example environment depicted in FIG. 3A. In particular, the second representation 330 of the environment depicted in FIG. 3B is the same representation as the first representation 300 of the environment depicted in FIG. 3A, except the representation 310 of the parked vehicle has been removed.

Because it is often preferable for a representation of an environment to be "empty," i.e., to include only static objects that are permanent features of the environment, a system (e.g., the static surfel prediction system 190 depicted in FIG. 1) might remove the representation 310 of the parked vehicle from the first representation 300 of the environment to generate the second representation 330 of the environment. For example, if the first representation 300 of the environment is a surfel representation, then the system might identify each surfel in the first representation 300 of the environment that is non-static, and remove the identified non-static surfels to generate the second representation 330 of the environment. As a particular example, the system might remove each surfel that has associated data that includes a "static" label that is below a threshold, e.g., 0.3 or 0.5. As another particular example, the system might remove each surfel with an object prediction label that is classified as "non-static." That is, the system would remove the "vehicle" surfels because "vehicle" surfels are classified as "non-static," while the system would not remove the "curb" surfels because the "curb" surfels are classified as "static."

Notably, the second representation 330 of the environment has a "hole" where the representation 310 of the parked vehicle used to be. That is, the second representation 330 includes a region 340 that is "empty," i.e., that does not include any surfels.

The region in the real-world environment corresponding to the region 340 of the second representation 330 is often non-empty, i.e., includes one or more static objects that were obstructed by the representation of the non-static object depicted in the first representation 300. In this case, the region in the real-world environment corresponding to the region 340 includes a curb (i.e., an extension of the curb characterized by the representation 320 of the curb) that was obstructed by the representation 310 of the parked vehicle.

Figure 3C:
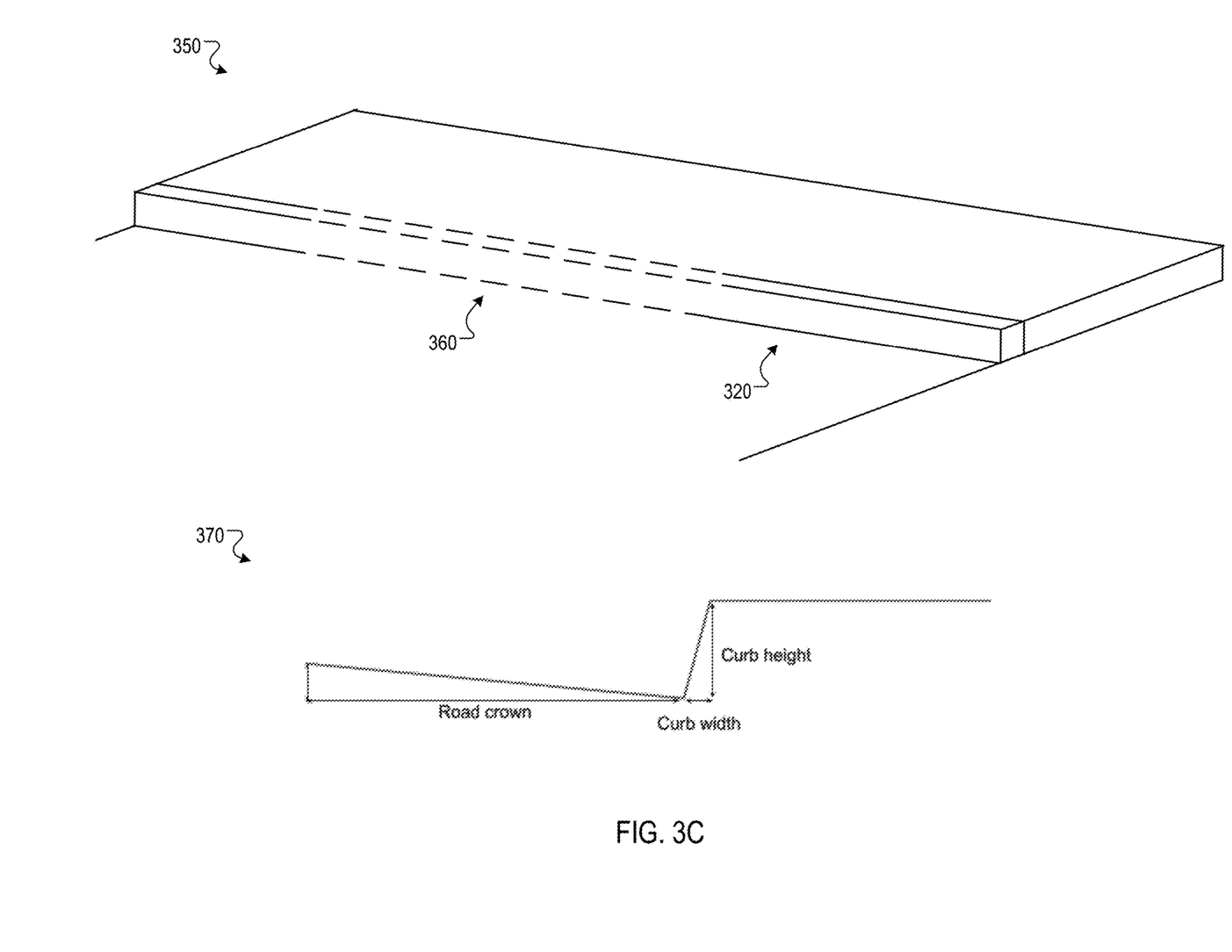

FIG. 3C is an illustration of a third representation 350 of the example environment depicted in FIG. 3A and FIG. 3B. In particular, the third representation 350 is the output of a system (e.g., the static surfel prediction system 190 depicted in FIG. 1) that processed the second representation 330 of the environment in order to generate a predicted representation 360 of predicted static surfaces obstructed by the parked vehicle.

In some implementations, the system can be an offline server system, e.g., a component the server system 120 depicted in FIG. 1. In some other implementations, the system is an on-board system of a vehicle, e.g., a component of the on-board system 110 depicted in FIG. 1.

For example, the third representation 350 can be a surfel representation, where the predicted representation 360 includes multiple "static" predicted surfels characterizing the curb behind the parked vehicle, e.g., surfels with associated data that identifies the object characterized by the surfels to be a "curb" and/or that includes a high "static" label, e.g., 1.0 or 0.95.

The third representation 350 of the environment can be used by multiple different vehicle operating in the environment to make driving decisions because the third representation 350 includes a complete representation of the static surfaces in the environment, and no representation of non-static surfaces in the environment. In particular, the third representation 350 includes both i) the static surfels that were originally in the first representation 300 of the environment, e.g., the representation 320 of the curb; and ii) the predicted static surfels generated by the system, e.g., the predicted representation 360 of the portion of the curb obstructed by the parked vehicle.

As a particular example, the system can generate the predicted representation 360 using interpolation, i.e., non-guided interpolation. That is, the system can interpolate the predicted static surfaces using the surrounding known static surfaces (i.e., the representation 320 of the curb), e.g., using linear interpolation. For example, if a voxel grid is imposed on the environment and each surfel in the representation 330 is assigned to a voxel, then for each voxel in the region 340 the system can assign a label to the surfel in the voxel that is the same label as the closest known surfel, e.g., a surfel in the representation 320 of the curb.

As another particular example, the system can generate the predicted representation 360 using guided interpolation. That is, the system can interpolate the predicted static surfaces using i) the surrounding known static surfaces (i.e., the representation 320 of the curb) and ii) guidance data characterizing a predicted shape of the predicted static surfaces. In this specification, "guidance data" is data characterizing a predicted shape of an object or surface, independent of the location and orientation of the object or surface in the environment.

The system can determine each predicted surfel p in the region Ω (corresponding to the region 340 depicted in FIG. 3B) characterizing the predicted static surfaces according to the following formula:

$$\sum_{q \in N_p \cap \delta\Omega} f_q^* + \sum_{q \in N_p} v_{pq}$$

where $N_p$ is the set of neighboring surfels of the surfel p, $f^*_q$ is the known parameters of surfel q, $\delta\Omega$ is the border of the region Ω, and $v_{pq}$ is a function defined by the guidance data.

The guided interpolation constraint is a linear constraint between a surfel p and its neighbors $N_p$, roughly constraining the sum of the differences between a surfel and its neighbors to be equal to the sun of the corresponding gradients from the guidance data. For example, if the gradient of the guidance field is zero, the constraint encourages the surfel to be the average of its $|N_p|$ neighbors. The guided interpolation constraint can be implemented using a set of sparse linear equations and can be solved efficiently, e.g., using LU factorization or conjugate gradients.

The guidance data can be obtained according to a predicted type of the predicted static surfaces. For example, the system generating the predicted representation 360 of the curb can obtain guidance data corresponding to curbs. As a particular example, the system can identify the representation 320 of the curb in the second representation 330 of the environment (e.g., identify multiple "curb" surfels), and determine that the obscured static surfaces in the region 340 are also curb surfaces. As another particular example, the system can use a roadgraph of the environment to determine a type of the obscured static surfaces in the region 340. That is, the system can identify in the roadgraph that there is a curb at the location in the environment corresponding to the region 340, and thus that the obscured static surfaces are curb surfaces. In this specification, a roadgraph is data representing the known features of the environment, e.g., a top-down image of the environment, that can include representation of the features of the roads in the environment such as the lanes of the road, cross walks, traffic lights, stop signs, etc.

An illustration of example guidance data 370 corresponding to a curb is depicted in FIG. 3C. The guidance data 370 defines a predicted shape of a curb, independent of the location of the curb in a particular environment. For example, the guidance data includes a geometric description of each feature of a curb, including the crown of the road, the width of the curb, and the height of the curb.

In some implementations, the guidance data corresponding to a particular road feature (e.g., "curb" or "highway rail") can be hand-crafted. In some other implementation, the guidance data can be estimated by computing statistics on other objects of the same type in the environment. For example, the system might obtain sensor data characterizing other curbs in the environment (e.g., the curb characterized by the representation 320), and determine a predicted shape of the obscured curb using the known shape of the observed curbs.

As another particular example, the system can generate the predicted representation 360 using a random sample consensus (RANSAC) technique. For example, the system can fit a plane to each of one or more planar regions in the region 350. That is, one or more regions that should be represented by multiple surfels in a single two-dimensional plane (e.g., a first region corresponding to the street, a second region corresponding to the vertical portion of the curb, and a third region corresponding to the horizontal portion of the curb) can be identified, and the system can use RANSAC to fit a plane of surfels to each region to generate the representation 360. In some implementations, the one or more planar regions can be manually identified by a user; in some other implementations, the one or more planar regions can be identified by a trained machine learning model, e.g., a neural network.

As another particular example, the system can generate the predicted representation 360 using a trained neural network, e.g., a convolutional neural network. For example, the system can use one or more "in-painting" neural network techniques to generate the predicted representation 360. That is, the system can provide a network input that includes data identifying known static surfaces (e.g., one or more surfels in the representation 320 of the curb) to the trained neural network and the neural network can process the network input to generate a network output that includes a classification for each surfel in the region 340. The system can determine the network output to be the predicted representation 360.

interpolate the predicted static surfaces using i) the surrounding known static surfaces (i.e., the representation 320 of the curb) and ii) guidance data characterizing a predicted shape of the predicted static surfaces.

Figure 4:
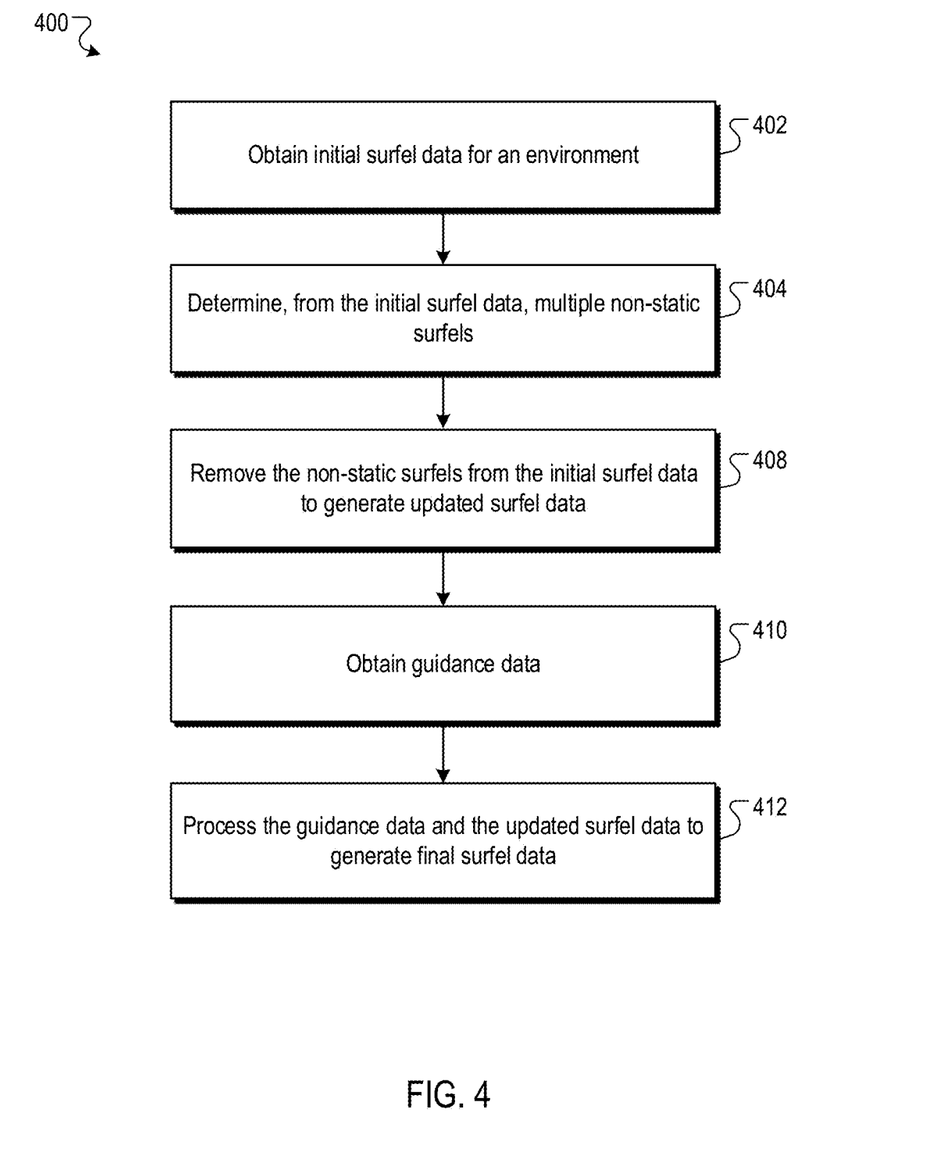
FIG. 4 is a flow diagram of an example process for generating a surfel map that represents static surfaces in an environment.

FIG. 4 is a flow diagram of an example process 400 for generating a surfel map that represents static surfaces in an environment. For convenience, the process 400 will be described as being performed by a system of one or more computers located in one or more locations. For example, a static surfel prediction system, e.g., the static surfel prediction system 190 depicted in FIG. 1, appropriately programmed in accordance with this specification, can perform the process 400.

The system obtains initial surfel data for an environment (step 402). The initial surfel data can include multiple surfels that each correspond to a respective different location in the environment. Each surfel in the initial surfel data can also have associated data. The associated data of each surfel can include a respective class prediction for each of one or more other classes of semantic information for the surface represented by the surfel, e.g., object type, reflectivity, opacity, color, etc. In some implementations, the surfel data is represented using a voxel grid, where each surfel in the surfel data corresponds to a different voxel in the voxel grid.

In some implementations, the initial surfel data has been generated from sensor data captured by one or more sensors on-board respective vehicles navigating in the environment at respective previous time points.

The system determines, from the initial surfel data, multiple non-static surfels (step 404). For example, the object type of each surfel can indicate whether the corresponding object is likely to be static or non-static; e.g., objects of type "fire hydrant" might be classified as static while objects of type "traffic cone" might be classified as non-static. As another example, the associated data for each surfel can include a "static" label that predicts whether the surfel is a static surfel or a non-static surfel.

The system removes the non-static surfels from the initial surfel data to generate updated surfel data (step 408).

The system obtains guidance data that characterizes a prediction for static surfaces in one or more first regions of the environment (step 410). Each first region is a region that was represented by the non-static surfels in the initial surfel data that were removed in the updated surfel data. Therefore, the first regions are not represented in the updated surfel data.

In some implementations, the system predicts a type of the static surfaces obscured by the non-static objects, e.g., "curb" or "fence." The system can then obtain guidance data that describes static surfaces of the determined predicted type.

The system processes the guidance data and the updated surfel data to generate final surfel data (step 412). The final surfel data includes, for each first region of the environment, multiple predicted surfels that represent static surfaces in the first region that are partially or wholly obscured by non-static objects represented in the initial surfel data represented by the determined non-static surfels. The final surfel data can also include the surfels in the updated surfel data, i.e., the surfels from the initial surfel data that represent static objects in the environment.

The predicted surfels can have associated data that indicates that they are static surfels; e.g., each predicted surfel can have an object type that indicates that the corresponding object in the environment is a static object.

The system can provide the final surfel data to a server system that maintains global surfel data which can be used by multiple vehicles operating in the environment. For example, a path-planning system of the vehicles can generate a planned path for the vehicles using data generated from the final surfel data.

In some cases, the predicted surfels in the final surfel can represent static surfaces that have not been observed by any of the multiple vehicle operating in the environment that are using the final surfel data. That is, it is not necessary for any vehicle to obtain sensor data characterizing the predicted static surfaces in the environment in order for the multiple vehicles to make driving decisions according to the predicted static surfaces.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, off-the-shelf or custom-made parallel processing subsystems, e.g., a GPU or another kind of special-purpose processing subsystem. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program which may also be referred to or described as a program, software, a software application, an app, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

As used in this specification, an "engine," or "software engine," refers to a software implemented input/output system that provides an output that is different from the input. An engine can be an encoded block of functionality, such as a library, a platform, a software development kit ("SDK"), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of nonvolatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g, a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

In addition to the embodiments described above, the following embodiments are also innovative:

Embodiment 1 is a method comprising:

obtaining initial surfel data comprising a plurality of surfels, wherein each surfel corresponds to a respective different location in an environment and each surfel represents a surface of an object;

determining a plurality of non-static surfels from the plurality of surfels;

obtaining guidance data that characterizes a prediction for static surfaces in one or more first regions of the environment, wherein each first region of the environment was obscured by the plurality of non-static surfels in the initial surfel data; and processing the guidance data and the initial surfel data to generate final surfel data that comprises, for each first region of the environment, a plurality of predicted surfels that represent static surfaces in the first region that are partially or wholly obscured by objects represented by respective non-static surfels.

Embodiment 2 is the method of embodiment 1, wherein each surfel has associated data that includes a static label characterizing a predicted level of permanence of the surface represented by the surfel; and each static surfel has a static label that satisfies a first threshold.

Embodiment 3 is the method of any one of embodiments 1 or 2, wherein processing the guidance data and the initial surfel data to generate the final surfel data comprises:

removing the plurality of non-static surfels from the initial surfel data to generate updated surfel data; and processing the guidance data and the initial surfel data to generate the final surfel data.

Embodiment 4 is the method of embodiment 3, wherein the final surfel data further comprises the surfels in the updated surfel data.

Embodiment 5 is the method of any one of embodiments 1-4, wherein:

the initial surfel data has been generated from sensor data captured by one or more sensors on-board respective vehicles operating in the environment at respective previous time points; and the one or more first regions in the environment where obscured from a field of view of the one or more sensors by the plurality of non-static surfels.

Embodiment 6 is the method of embodiment 5, wherein the predicted surfels represent static surfaces that have not been observed in any sensor observations of a vehicle of a plurality of vehicles operating in the environment.

Embodiment 7 is the method of any one of embodiments 1-6, wherein each predicted surfel has a static label that satisfies a second threshold.

Embodiment 8 is the method of any one of embodiments 1-7, wherein processing the guidance data and the updated surfel data comprises processing the guidance data and the updated surfel data using guided interpolation.

Embodiment 9 is the method of any one of embodiments 1-8, wherein obtaining guidance data comprises:
  determining a predicted type of the predicted static surfaces, and
  obtaining guidance data corresponding to the determined predicted type.

Embodiment 10 is the method of any one of embodiments 1-9, wherein each surfel in the initial surfel data comprises:
  coordinates in a three-dimensional coordinate system of the environment that characterize a position of the surfel in the environment, and
  a normal vector that characterizes an orientation of the surfel in the environment.

Embodiment 11 is the method of any one of embodiments 1-10, wherein the initial surfel data comprises data characterizing a voxel gird, wherein each surfel in the surfel data corresponds to a different voxel in the voxel grid.

Embodiment 12 is a system comprising: one or more computers and one or more storage devices storing instructions that are operable, when executed by the one or more computers, to cause the one or more computers to perform the method of any one of embodiments 1 to 11.

Embodiment 13 is one or more non-transitory computer storage media encoded with a computer program, the program comprising instructions that are operable, when executed by data processing apparatus, to cause the data processing apparatus to perform the method of any one of embodiments 1 to 11.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A method comprising:
  obtaining initial surfel data comprising a plurality of surfels, wherein each surfel corresponds to a respective different location in an environment and each surfel represents a surface of an object;
  determining a plurality of non-static surfels from the plurality of surfels;
  obtaining guidance data that characterizes a prediction for static surfaces in one or more first regions of the environment, wherein each first region of the environment was obscured by the plurality of non-static surfels in the initial surfel data; and
  processing the guidance data and the initial surfel data to generate final surfel data that comprises, for each first region of the environment, a plurality of predicted surfels that represent static surfaces in the first region that are partially or wholly obscured by objects represented by respective non-static surfels.

2. The method of claim 1, wherein:
  each surfel has associated data that includes a static label characterizing a predicted level of permanence of the surface represented by the surfel; and
  each static surfel has a static label that satisfies a first threshold.

3. The method of claim 1, wherein processing the guidance data and the initial surfel data to generate the final surfel data comprises:
  removing the plurality of non-static surfels from the initial surfel data to generate updated surfel data; and
  processing the guidance data and the initial surfel data to generate the final surfel data.

4. The method of claim 3, wherein the final surfel data further comprises the surfels in the updated surfel data.

5. The method of claim 1, wherein:
  the initial surfel data has been generated from sensor data captured by one or more sensors on-board respective vehicles operating in the environment at respective previous time points; and
  the one or more first regions in the environment where obscured from a field of view of the one or more sensors by the plurality of non-static surfels.

6. The method of claim 5, wherein the predicted surfels represent static surfaces that have not been observed in any sensor observations of a vehicle of a plurality of vehicles operating in the environment.

7. The method of claim 1, wherein each predicted surfel has a static label that satisfies a second threshold.

8. The method of claim 1, wherein processing the guidance data and the updated surfel data comprises processing the guidance data and the updated surfel data using guided interpolation.

9. The method of claim 1, wherein obtaining guidance data comprises:
  determining a predicted type of the predicted static surfaces, and
  obtaining guidance data corresponding to the determined predicted type.

10. The method of claim 1, wherein each surfel in the initial surfel data comprises:
  coordinates in a three-dimensional coordinate system of the environment that characterize a position of the surfel in the environment, and
  a normal vector that characterizes an orientation of the surfel in the environment.

11. The method of claim 1, wherein the initial surfel data comprises data characterizing a voxel gird, wherein each surfel in the surfel data corresponds to a different voxel in the voxel grid.

12. A system comprising one or more computers and one or more storage devices storing instructions that are operable, when executed by the one or more computers, to cause the one or more computers to perform operations comprising:
   obtaining initial surfel data comprising a plurality of surfels, wherein each surfel corresponds to a respective different location in an environment and each surfel represents a surface of an object;
   determining a plurality of non-static surfels from the plurality of surfels;
   obtaining guidance data that characterizes a prediction for static surfaces in one or more first regions of the environment, wherein each first region of the environment was obscured by the plurality of non-static surfels in the initial surfel data; and
   processing the guidance data and the initial surfel data to generate final surfel data that comprises, for each first region of the environment, a plurality of predicted surfels that represent static surfaces in the first region that are partially or wholly obscured by objects represented by respective non-static surfels.

13. The system of claim 12, wherein:
   each surfel has associated data that includes a static label characterizing a predicted level of permanence of the surface represented by the surfel; and
   each static surfel has a static label that satisfies a first threshold.

14. The system of claim 12, wherein processing the guidance data and the initial surfel data to generate the final surfel data comprises:
   removing the plurality of non-static surfels from the initial surfel data to generate updated surfel data; and
   processing the guidance data and the initial surfel data to generate the final surfel data.

15. The system of claim 12, wherein:
   the initial surfel data has been generated from sensor data captured by one or more sensors on-board respective vehicles operating in the environment at respective previous time points; and
   the one or more first regions in the environment where obscured from a field of view of the one or more sensors by the plurality of non-static surfels.

16. The system of claim 12, wherein processing the guidance data and the updated surfel data comprises processing the guidance data and the updated surfel data using guided interpolation.

17. One or more non-transitory computer storage media encoded with computer program instructions that when executed by a plurality of computers cause the plurality of computers to perform operations comprising:
   obtaining initial surfel data comprising a plurality of surfels, wherein each surfel corresponds to a respective different location in an environment and each surfel represents a surface of an object;
   determining a plurality of non-static surfels from the plurality of surfels;
   obtaining guidance data that characterizes a prediction for static surfaces in one or more first regions of the environment, wherein each first region of the environment was obscured by the plurality of non-static surfels in the initial surfel data; and
   processing the guidance data and the initial surfel data to generate final surfel data that comprises, for each first region of the environment, a plurality of predicted surfels that represent static surfaces in the first region that are partially or wholly obscured by objects represented by respective non-static surfels.

18. The non-transitory computer storage media of claim 17, wherein processing the guidance data and the initial surfel data to generate the final surfel data comprises:
   removing the plurality of non-static surfels from the initial surfel data to generate updated surfel data; and
   processing the guidance data and the initial surfel data to generate the final surfel data.

19. The non-transitory computer storage media of claim 17, wherein:
   the initial surfel data has been generated from sensor data captured by one or more sensors on-board respective vehicles operating in the environment at respective previous time points; and
   the one or more first regions in the environment where obscured from a field of view of the one or more sensors by the plurality of non-static surfels.

20. The non-transitory computer storage media of claim 17, wherein processing the guidance data and the updated surfel data comprises processing the guidance data and the updated surfel data using guided interpolation.

* * * * *